United States Patent
Hooker et al.

(10) Patent No.: US 12,388,301 B2
(45) Date of Patent: Aug. 12, 2025

(54) WIRELESS TRANSMITTER LOCATION DETERMINATION USING CONTROLLABLY VARIED LOAD

(71) Applicant: Midea Group Co., Ltd., Foshan (CN)

(72) Inventors: John Kenneth Hooker, Louisville, KY (US); Craig Benjamin Williams, Louisville, KY (US); Hieu Manh Vu, Louisville, KY (US)

(73) Assignee: MIDEA GROUP CO., LTD., Guangdong (CN)

( * ) Notice: Subject to any disclaimer, the term of this patent is extended or adjusted under 35 U.S.C. 154(b) by 0 days.

(21) Appl. No.: 18/478,383

(22) Filed: Sep. 29, 2023

(65) Prior Publication Data

US 2025/0112506 A1    Apr. 3, 2025

(51) Int. Cl.
*H02J 50/90* (2016.01)
*H02J 50/10* (2016.01)

(52) U.S. Cl.
CPC .............. *H02J 50/90* (2016.02); *H02J 50/10* (2016.02)

(58) Field of Classification Search
CPC .................................. H02J 50/90; H02J 50/10
See application file for complete search history.

(56) References Cited

U.S. PATENT DOCUMENTS

| | | | |
|---|---|---|---|
| 9,438,045 B1 | 9/2016 | Leabman | |
| 10,439,450 B2 | 10/2019 | Lee | |
| 10,446,317 B2 | 10/2019 | Hall | |
| 11,201,500 B2 | 12/2021 | Partovi | |
| 2015/0022194 A1 | 1/2015 | Almalki | |
| 2016/0100466 A1* | 4/2016 | Kim | H05B 47/17 315/250 |
| 2018/0287413 A1* | 10/2018 | Jung | H02J 50/402 |
| 2019/0356177 A1 | 11/2019 | Swan | |

FOREIGN PATENT DOCUMENTS

| | | |
|---|---|---|
| WO | 2019183782 A1 | 10/2019 |
| WO | 2022251131 A1 | 12/2022 |

OTHER PUBLICATIONS

Delong, Brock J. et al., A Radiating Near-Field Patch Rectenna for Wireless Power Transfer to Medical Implants at 2.4 Ghz, IEEE, 8 pages, dated 2018.
Nutwong, Supapong et al., A Novel Output Power Control of Wireless Powering Kitchen Appliance System with Free-Positioning Feature, Energies, MDPI, 19 pages, dated Jun. 27, 2018.
Voyantic, Measuring an NFC reader's magnetic field strength and creating the NFC reader profile for Tagformance HF, Retrieved from: https://voyantic.com/wp-content/uploads/2021/11/2020-Measuring-NFC-reader-magnetic-field-strength.pdf, 10 pages, dated Jul. 2020.

* cited by examiner

*Primary Examiner* — Lincoln D Donovan
*Assistant Examiner* — Alex W Lam
(74) *Attorney, Agent, or Firm* — Gray Ice Higdon

(57) ABSTRACT

An apparatus and method of locating a wireless power transmitter in which a variable load coupled to a wireless power receiver configured to receive a wireless power signal from the wireless power transmitter is controllably varied to maintain a harvested voltage of the wireless power signal within a predetermined range. By doing so, power supplied to a wirelessly powered appliance coupled to the wireless power receiver is maintained within an operational envelope of the wirelessly powered appliance.

20 Claims, 3 Drawing Sheets

WIRELESS TRANSMITTER LOCATION DETERMINATION USING CONTROLLABLY VARIED LOAD

BACKGROUND

A wide variety of kitchen appliances are commonly used in single-family and multi-family residential applications. Many of these appliances, e.g., dishwashers, wine coolers, refrigerators, laundry washing machines, ovens, ranges, cooktops, etc., are installed in a "built-in" fashion such as under a countertop, within a cut-out formed in the countertop, or in a designated opening in the arrangement of kitchen cabinets. Built-In appliances are often hard-wired into a household electrical circuit or are plugged in to a dedicated electrical outlet that is generally hidden from view when the appliance is in its installed location.

Many consumers, however, also rely on various smaller kitchen appliances to perform more specific tasks, including, for example, microwave ovens, rice cookers, blenders, mixers, food processors, toasters, air fryers, pressure cookers, coffee makers, espresso machines, etc. While sometimes these appliances are stored on the countertop when not in use, in other instances these appliances may be stored in the cabinets or elsewhere and brought out when needed. To power such devices, many kitchens include electrical outlets on the wall between the upper cabinets and the countertop, which is often referred to as a backsplash, so that such appliances may be plugged in when needed. The power cords used by such appliances, however, can be cumbersome and unsightly, both during use and in storage.

More recently, it has been proposed to use wireless power for smaller kitchen appliances, e.g., based upon the Ki Kitchen Cordless Standard developed by the Wireless Power Consortium. Rather than relying on a power cord plugged into an electrical outlet, a wirelessly-powered appliance includes a wireless power receiver that is oriented on the bottom of the appliance to receive power wirelessly from a wireless power transmitter that is embedded in a cooktop, a countertop or table when the appliance is positioned directly over the wireless power transmitter.

It has been found, however, that efficient power transfer from a wireless power transmitter to a wirelessly powered appliance is heavily dependent upon proper positioning of the wireless power receiver of the wirelessly powered appliance relative to the wireless power transmitter. For some applications, however, the precise location of the wireless power transmitter may not be readily apparent. For example, where a wireless power transmitter is installed underneath a countertop or another opaque surface, the location of the wireless power transmitter may not be readily apparent. While stickers or other indicators may be placed on a countertop to assist a user with finding the wireless power transmitter, even the placement of such indicators is also complicated by the fact that the wireless power transmitter is effectively hidden from view, and incorrect placement of the indicator may make it even more difficult for a user to locate the precise location of the wirelessly powered appliance on the countertop that optimizes power transfer from the wireless power transmitter.

Moreover, when a wirelessly powered appliance lacks a battery or any secondary source of power, a sufficient misalignment between the wireless power transmitter and wireless power receiver may result insufficient power being delivered to the wirelessly powered appliance to maintain the wirelessly powered appliance in an active state. Thus, if a user manually attempts to reposition a wirelessly powered appliance to improve alignment, a risk exists that the user may move the appliance to a location that causes the appliance to reset or shut off entirely.

Therefore, a substantial need continues to exist in the art for a manner of locating a wireless power transmitter used to power a wirelessly powered appliance.

SUMMARY

The herein-described embodiments address these and other problems associated with the art by providing an apparatus and method capable of locating a wireless power transmitter in which a variable load coupled to a wireless power receiver configured to receive a wireless power signal from the wireless power transmitter is controllably varied to maintain a harvested voltage of the wireless power signal within a predetermined range, in part such that power supplied to a wirelessly powered appliance coupled to the wireless power receiver is maintained within an operational envelope of the wirelessly powered appliance.

Therefore, consistent with one aspect of the invention, a method of locating a wireless power transmitter may include, in a wirelessly powered appliance, receiving a wireless power signal communicated by the wireless power transmitter with a wireless power receiver of the wirelessly powered appliance when the wireless power receiver is positioned at a plurality of positions relative to the wireless power transmitter, determining a plurality of alignment parameters associated with alignment of the wireless power receiver with the wireless power transmitter at the plurality of positions based at least in part on the received wireless power signal, and varying a variable load coupled to the wireless power receiver to maintain a harvested voltage of the wireless power signal within a predetermined range when receiving the wireless power signal.

In some embodiments, the plurality of positions includes first and second positions and the plurality of alignment parameters includes first and second alignment parameters respectively associated with the first and second positions, and the method further includes determining if alignment of the wireless power receiver and the wireless power transmitter is improved when moving from the first position to the second position by comparing the first and second alignment parameters. In addition, some embodiments may further include generating a notification indicating whether the alignment of the wireless power receiver and the wireless power transmitter is improved when moving from the first position to the second position. Some embodiments may further include determining a suggested movement direction based at least in part on the comparison of the first and second alignment parameters, and generating a direction notification indicating the suggested movement direction. Further, in some embodiments, determining the suggested movement direction is further based upon input from an accelerometer of the wirelessly powered device.

In some embodiments, the first and second alignment parameters are first and second harvested voltage values. In addition, in some embodiments, varying the variable load includes decreasing the variable load when the wireless power receiver is positioned at a first position of the plurality of positions in response to determining that the harvested voltage of the wireless power signal meets a first threshold. Some embodiments may also include generating an undervoltage notification when the wireless power receiver is positioned at a second position of the plurality of positions in response to determining that the harvested voltage of the wireless power signal meets a second threshold that is below the first threshold. In addition, some embodiments may also include generating an undervoltage notification when the wireless power receiver is positioned at a second position of the plurality of positions in response to determining that the variable load meets a second threshold.

Moreover, in some embodiments, varying the variable load includes increasing the variable load when the wireless power receiver is positioned at a first position of the plurality of positions in response to determining that the harvested voltage of the wireless power signal meets a first threshold. Some embodiments may also include generating an overvoltage notification when the wireless power receiver is positioned at a second position of the plurality of positions in response to determining that the harvested voltage of the wireless power signal meets a second threshold that is above the first threshold. Some embodiments may further include generating an overvoltage notification when the wireless power receiver is positioned at a second position of the plurality of positions in response to determining that the variable load meets a second threshold.

Some embodiments may also include initializing the variable load at an initial load at initiation of a wireless power transmitter locating process. In some embodiments, the wireless power transmitter and the wireless power receiver are compliant with the Ki wireless power standard, and varying the variable load coupled to the wireless power receiver to maintain the harvested voltage of the wireless power signal within the predetermined range when receiving the wireless power signal maintains the harvested voltage above a reset voltage level and below an overvoltage protection voltage level of the wirelessly powered appliance. In addition, in some embodiments, the variable load includes one or more LEDs driven by a variable brightness LED driver circuit, and varying the variable load includes varying a brightness of the one or more LEDs. In some embodiments, the variable load includes a plurality of discrete loads, and varying the variable load includes individually activating or deactivating each of the plurality of discrete loads.

Consistent with another aspect of the invention, an apparatus may include at least one memory, and at least one processor coupled to the at least one memory and configured upon execution of program code stored in the memory to locate a wireless power transmitter by determining a plurality of alignment parameters associated with alignment of a wireless power receiver of a wirelessly powered appliance with the wireless power transmitter at a plurality of positions based at least in part on a wireless power signal communicated from the wireless power transmitter to the wireless power receiver when the wireless power receiver is positioned at the plurality of positions relative to the wireless power transmitter, and varying a variable load coupled to the wireless power receiver to maintain a harvested voltage of the wireless power signal within a predetermined range when receiving the wireless power signal.

Moreover, in some embodiments, the at least one memory and at least one processor are disposed in the wirelessly powered appliance. Also, in some embodiments, the at least one memory and at least one processor are disposed in a wireless power system that controls the wireless power transmitter. In some embodiments, the at least one memory and at least one processor are disposed in a user device in communication with at least one of the wirelessly powered appliance and a wireless power system that controls the wireless power transmitter.

Other embodiments may include various methods for making and/or using any of the aforementioned constructions and/or various apparatuses for performing any the aforementioned operations.

These and other advantages and features, which characterize the invention, are set forth in the claims annexed hereto and forming a further part hereof. However, for a better understanding of the invention, and of the advantages and objectives attained through its use, reference should be made to the Drawings, and to the accompanying descriptive matter, in which there is described example embodiments of the invention. This summary is merely provided to introduce a selection of concepts that are further described below in the detailed description, and is not intended to identify key or essential features of the claimed subject matter, nor is it intended to be used as an aid in limiting the scope of the claimed subject matter.

DETAILED DESCRIPTION

Figure 1:
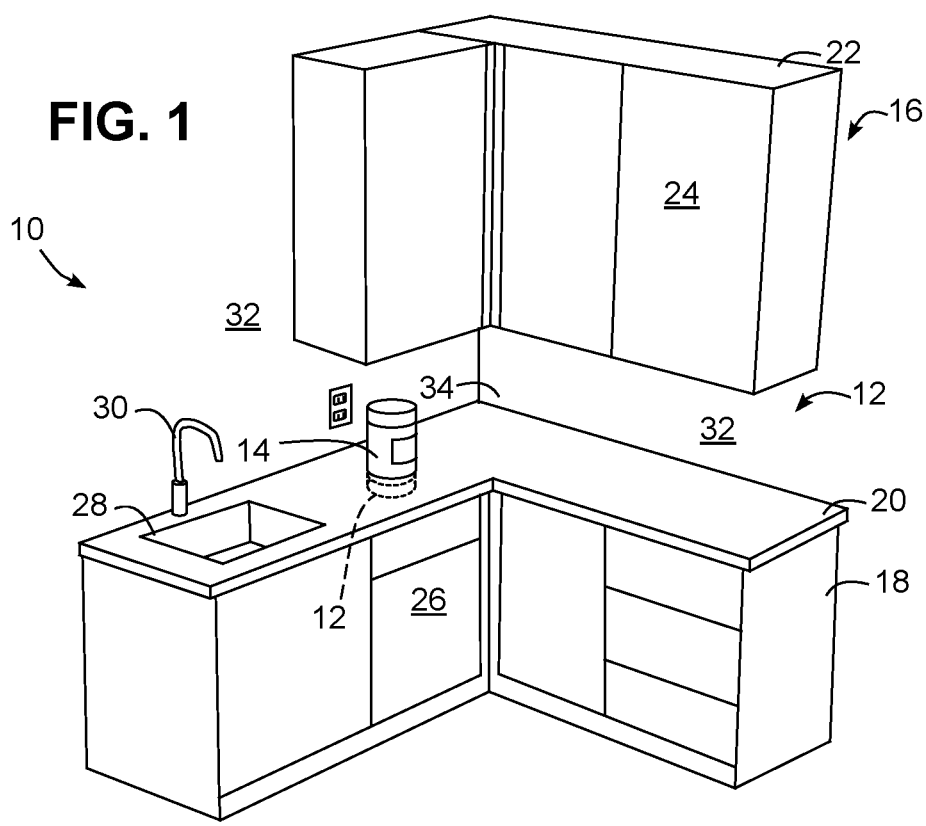
FIG. 1 is a perspective view of a room incorporating an undercounter wireless power system consistent with some embodiments of the invention.

Turning now to the drawings, wherein like numbers denote like parts throughout the several views, FIG. 1 illustrates an example room (e.g., a kitchen) 10 within which is installed an undercounter wireless power system 12 suitable for powering one or more wirelessly powered appliances, e.g., a wirelessly powered appliance 14 implemented as a pressure cooker. Room 10 includes a built-in cabinet system 16, which includes one or more base cabinets 18 that support a countertop 20 and one or more upper or wall cabinets 22 that are positioned over countertop 20. Cabinets 18, 22 may include doors, e.g., door 24, in some instances, or may include drawers or open shelves, and it will be appreciated that in some instances, various built-in appliances (e.g., dishwasher 26) may also be mounted or positioned within built-in cabinet system 16 (other appliances include, but are not limited to, refrigerators, ovens, ranges, cooktops, laundry washing machines, dryers, etc.) One or more sinks 28 may also be disposed on countertop 20 and may be supplied with water by a faucet 30.

Cabinets 18, 22 are generally secured along one or more walls 32 in room 10, with wall cabinets 22 generally mounted to walls 32 and positioned above counter height, e.g., above countertop 20, which is supported by base cabinets 18. In the United States, for example, the countertop may be at a height (from the floor) of approximately 36 inches with the wall cabinets at a height (from the floor) of approximately 54 inches, such that the wall area between the countertop and the bottom of the wall cabinets, referred to herein as a backsplash 34, has a height (from the countertop to the bottom of the wall cabinets) of approximately 18 inches. Base cabinets 18 may or may not be secured to walls 32, but are otherwise generally floor standing such that their load is predominantly borne by the floor rather than a wall, which is generally the case for wall cabinets 22.

It will be appreciated that other countertop, wall cabinet, and backsplash heights may be used in other embodiments. It will also be appreciated that room 10 may be any suitable indoor or outdoor living or working space within which it may be desirable to use a wirelessly powered appliance, including rooms lacking any built-in cabinets or countertops. Example types of suitable rooms include a kitchen, bar, entertainment area, bedroom, office area, retail establishment, etc. In some embodiments, room 10 may even be disposed within a boat or recreational vehicle.

Figure 2:
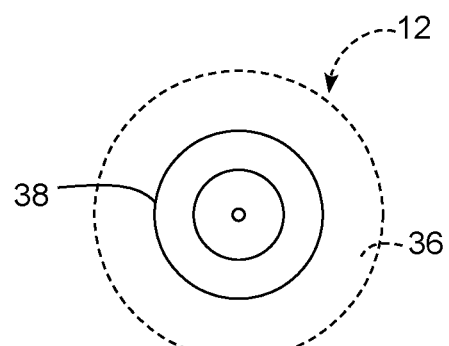
FIG. 2 is a top plan view of the countertop and wireless power system of FIG. 1.

With additional reference to FIG. 2, wireless power system 12 may include a wireless power transmitter 36 mounted underneath countertop 20. Furthermore, it will be appreciated that, due to the opaque nature of countertop 20, it may not be readily apparent to a user where exactly the wireless power transmitter 36 is located, so it may be desirable to place some indicator 38 on the top surface of countertop 20 to assist a user in properly positioning a wirelessly powered appliance over the wireless power transmitter. Indicator 38 may be formed on countertop 20 in a number of manners, e.g., via adhesives (such as where the indicator is a sticker), paint, etching, fasteners, etc. Furthermore, indicator 38 may take various forms, e.g., concentric rings, cross-hairs, or even a simple point or dot. The size of the indicator may also vary in different embodiments, and in some embodiments, may be large enough such that the outer perimeter of the indicator is still visible when the wirelessly powered appliance is positioned over the wireless power transmitter. An indicator may also be projected in some embodiments, e.g., downwardly from a light source positioned underneath a wall cabinet 22.

While wireless power transmitter 36 is positioned underneath a countertop 20 in FIGS. 1-2, it will be appreciated that a wireless power transmitter may be disposed underneath other surfaces and thus effectively hidden from view in other embodiments, e.g., a shelf, a piece of furniture, or a floor, among others. In addition, in some embodiments a wireless power transmitter may not be disposed underneath a horizontal surface, and as such, may be positioned behind a wall or other non-horizontal surface. It will therefore be appreciated that the principles of the invention may apply to a wide variety of applications where optimal positioning of a wireless power receiver of a wirelessly powered appliance is desired, including applications where at least a portion of the wireless power receiver is visible, but potentially occluded by the wirelessly powered appliance.

Figure 3:
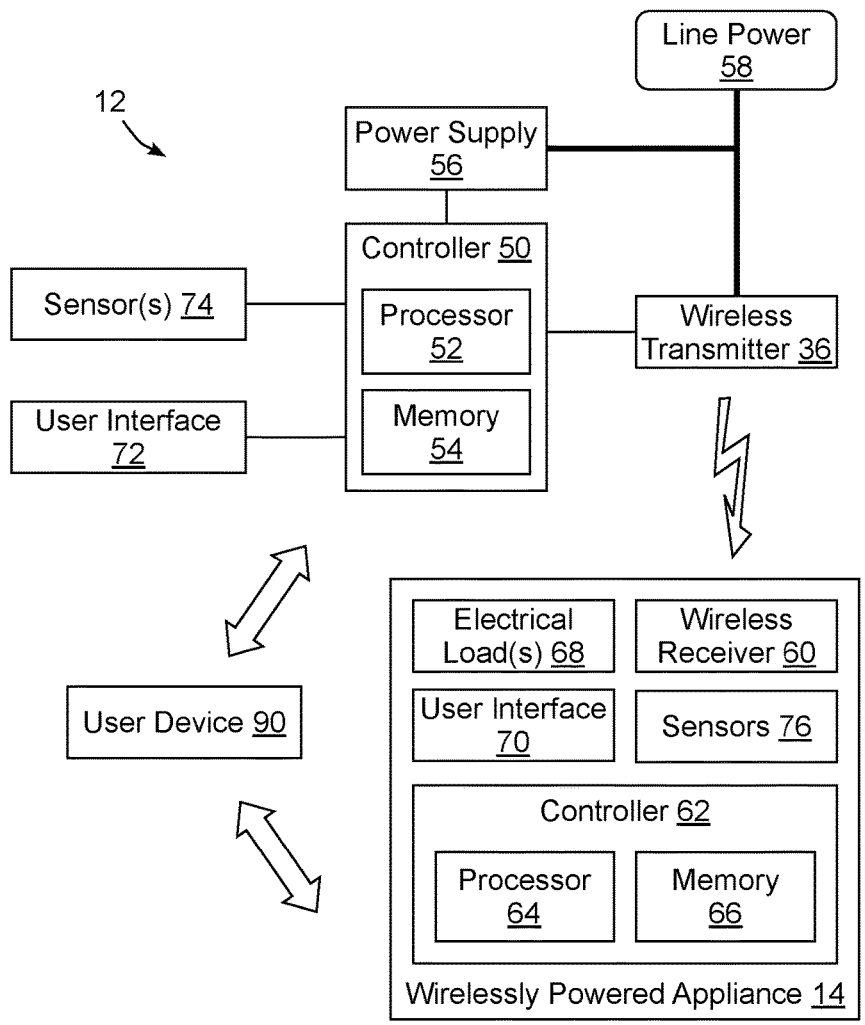
FIG. 3 is a block diagram of an example control system for the wireless power system and wirelessly powered appliance of FIG. 1.

Now turning to FIG. 3, wireless power system 12 may be under the control of a controller 50 that receives inputs from a number of components and drives a number of components in response thereto. Controller 50 may, for example, include one or more processors 52 and one or more memories 54 within which may be stored program code for execution by the one or more processors. The memories may be embedded in controller 50, but may also be considered to include volatile and/or non-volatile memories, cache memories, flash memories, programmable read-only memories, read-only memories, etc., as well as memory storage physically located elsewhere from controller 50, e.g., in a mass storage device or on a remote computer interfaced with controller 50. Controller 50 may also be implemented at least in part using discrete circuit logic, as will be appreciated by those of ordinary skill having the benefit of the instant disclosure.

As shown in FIG. 3, controller 50 may be powered by a power supply 56, e.g., an AC-DC power supply that is coupled to line power 58 (e.g., 120-240 VAC, as may be provided by a residential electrical circuit), via an electrical outlet and plug, or alternatively, a hard-wired connection. Line power 58 also supplies wireless power transmitter 36 with power. Controller 50 may control wireless power transmitter 36 to selectively activate/deactivate the wireless power transmitter, to regulate the power output of the wireless power transmitter, to communicate data to and/or receive data from wirelessly powered appliance 14, etc. In the illustrated embodiment, wireless power transmitter 36 is compatible with the Ki Kitchen Cordless Standard developed by the Wireless Power Consortium, although other wireless power or charging standards may be used in other embodiments, including, for example, the Qi Wireless Charging Standard also developed by the Wireless Power Consortium. It will be appreciated that the control over wireless power transmitter 36 by controller 50 to emit a wireless power signal would be well within the abilities of those of ordinary skill having the benefit of the instant disclosure.

Wirelessly powered appliance 14 may include a wireless power receiver 60 that, when positioned proximate wireless power transmitter 36, receives a wireless power signal to supply power to the wirelessly powered appliance. Wirelessly powered appliance 14 may also include a controller 62 to operate wireless power receiver 60, as well as to perform other appliance-related functions. Controller 62 may include one or more processors 64 and one or more memories 66 similar to processors and memories 52, 54 of wireless power system 12. Power received by wireless power receiver 60 may be used to also power one or more electrical loads 68, e.g., motors, heating elements, displays, etc., as well as controller 62 itself.

In some embodiments, wirelessly powered appliance 14 may include a user interface 66 to operate the appliance, and, beyond the supply of wireless power, may operate completely independently from wireless power system 12. In other embodiments, however, wireless power system 12 may be functionally integrated with wirelessly powered appliance 14, e.g., such that a user interface 72 of wireless power system 12 is used to display information received from wirelessly powered appliance 14 and/or other status information (e.g., via one or more status lights). Communication between wireless power system 12 and wirelessly powered appliance 14 may be over a Near Field Communication (NFC) wireless link as supported by the Ki standard, or via a separate wired or wireless network.

It may also be desirable to provide one or more sensors 74, 76 for sensing various states associated with wireless power system 12 and/or wirelessly powered appliance 14. For example, one or more temperature sensors and/or current, voltage, induction, and/or power sensors may be used in some embodiments to monitor wireless power transfer and prevent overheating. Various sensors associated with the primary functions of wirelessly powered appliance 14 may also be included. Other suitable sensors will be appreciated by those of ordinary skill having the benefit of the instant disclosure.

It should be appreciated that wireless power is distinguished from wireless charging in the context of the present disclosure, as while a wireless power system may in some instances provide power to charge a battery of an appliance or other electronic device wirelessly coupled to the wireless power system, such a use is secondary to providing wireless power to operate the appliance, i.e., to provide the primary power supply to the appliance during its active use. As such, a wirelessly powered appliance in many instances may not include any battery or other power storage element capable of independently providing sufficient power to operate the wirelessly powered appliance, such that the wirelessly powered appliance is effectively inoperable unless coupled to a wireless or wired power source (since some wirelessly powered appliances may also be capable of being plugged in). For many wirelessly powered appliances used for cooking for example, high power draw electrical loads such as electric motors and/or heating elements may be used, and to the extent any power storage element is present on such a wirelessly powered appliance, it is incapable of sufficiently powering such high power draw electrical loads, such that the wirelessly powered appliance is principally powered through a wireless power system as described herein.

In some embodiments, each controller 50, 62 may operate under the control of an operating system and may execute or otherwise rely upon various computer software applications, components, programs, objects, modules, data structures, etc. In addition, each controller 50, 62 may also incorporate hardware logic to implement some or all of the functionality disclosed herein. Further, in some embodiments, the sequences of operations performed by each controller 50, 62 to implement the embodiments disclosed herein may be implemented using program code including one or more instructions that are resident at various times in various memory and storage devices, and that, when read and executed by one or more hardware-based processors, perform the operations embodying desired functionality. Moreover, in some embodiments, such program code may be distributed as a program product in a variety of forms, and that the invention applies equally regardless of the particular type of computer readable media used to actually carry out the distribution, including, for example, non-transitory computer readable storage media. In addition, it will be appreciated that the various operations described herein may be combined, split, reordered, reversed, varied, omitted, parallelized and/or supplemented with other techniques known in the art, and therefore, the invention is not limited to the particular sequences of operations described herein.

In addition, in some embodiments, at least a portion of the functionality of wireless power system 12 and/or wirelessly powered appliance 14 may be implemented remote therefrom, e.g., using a user device 90, such as a mobile device, that is in communication with system 12 and/or appliance 14. As such, a controller discussed herein may also be incorporated partially or completely within a user device in some embodiments.

Numerous variations and modifications to wireless power system 12 and wirelessly powered appliance 14 illustrated in FIGS. 1-3 will be apparent to one of ordinary skill in the art, as will become apparent from the description below. Therefore, the invention is not limited to the specific implementations discussed herein.

Wireless Transmitter Location Determination Using Controllably Varied Load

As noted above, alignment between a wireless power transmitter and a wireless power receiver of a wirelessly powered appliance can have a significant effect on the efficiency of the power transfer from the transmitter to the receiver. However, where the wireless power transmitter is effectively hidden from the user, e.g., as a result of being mounted underneath an opaque surface such as a countertop, or as a result of the wireless power transmitter being occluded by the wirelessly powered appliance itself, it can be difficult to visually determine the optimal location to place the wirelessly powered appliance to maximize power transfer efficiency.

As such, it may be desirable to utilize a process to "locate" the wireless power transmitter. Within the context of the present disclosure, locating the wireless power transmitter may be considered to be a process whereby a wirelessly powered appliance is positioned at a plurality of different positions proximate a wireless power transmitter to determine a position of the wirelessly powered appliance that optimizes the power transfer efficiency between the wireless power transmitter and a wireless power receiver of the wirelessly powered appliance.

In some embodiments, the wirelessly powered appliance may be an operational appliance having one or more operational functions that, once the process of locating the wireless power transmitter is complete, are initiated by the user and are powered by wireless power supplied by the wireless power transmitter. As such, at least a portion of the operational appliance is intended to be maintained in a fixed location relative to the wireless power transmitter during use. The operational functions, for example, may be associated with various household or domestic tasks, including cooking, food preparation, cleaning, etc. Thus, a wirelessly powered appliance in some embodiments may be a small appliance, household appliance, domestic appliance, a power tool, etc., which has an additional function of locating a wireless power transmitter.

In other embodiments, however, the wirelessly powered appliance may be a task-specific installation appliance that is specifically designed to be used to locate a wireless power transmitter, and may be used, for example, by an installer or tradesperson during installation of the wireless power transmitter. Such an installation appliance thus may have no operational functions other than locating a wireless power transmitter. In some embodiments, such an installation appliance may be used, for example, in order to determine an optimal placement of an indicator such as a sticker on a surface such as a countertop to assist a user with placement of other wirelessly powered appliances after installation is complete. It will also be appreciated that an operational appliance may also be used in some embodiments to assist in placing an indicator on a countertop or other surface.

Thus, a location process consistent with the invention may be utilized in some embodiments to assist in placing an indicator on a surface to facilitate later placement of a wirelessly powered appliance on that surface. In other embodiments, however, a location process consistent with the invention may be utilized immediately prior to use of a wirelessly powered appliance to properly position the appliance prior to its operational use.

In order to determine the location of a wireless power transmitter in some embodiments, a wireless power signal communicated by the wireless power transmitter is received while a wirelessly powered appliance is positioned at a plurality of positions relative to the wireless power transmitter, and one or more alignment parameters are determined for each of the plurality of positions using the wireless power signal. An alignment parameter, in this regard, may be considered to be any parameter capable of being derived directly or indirectly from the wireless power signal to determine the relative alignment of a wireless power receiver with the wireless power transmitter. In some embodiments, for example, an alignment parameter may be a some aspect of an electrical signal that is generated in response to the wireless power signal, e.g., voltage, a power, a current, an electromagnetic field strength, etc. In other embodiments, an alignment parameter may be associated with the degree of coupling between the wireless power transmitter and the wireless power receiver, e.g., a coupling factor. It will also be appreciated that in some embodiments it is a comparison of alignment parameters associated with different positions that may be used in a location process, rather than absolute values of any particular alignment parameter, since inductive coupling improves, and thus power transfer is more efficient, the more closely the wireless power transmitter and receiver are aligned with one another. Thus, for example, an increase in a voltage of an electrical signal generated from the wireless power signal when the wirelessly powered appliance is moved from a first position to a second position generally indicates that the second position provides better alignment between the wireless power transmitter and receiver than the first, while a decrease in the voltage indicates the opposite.

Thus, in some embodiments, a location process may be an iterative process whereby a wirelessly powered appliance is incrementally moved between different positions and an alignment parameter is tracked to determine whether each movement increases or decreases alignment, until a position is found where the alignment is found to be the greatest.

In addition, in embodiments consistent with the invention, a variable load is controllably varied during the location process to maintain a harvested voltage from the wireless power signal within a predetermined range. It will be appreciated, in particular, that where a wirelessly powered appliance lacks a secondary power source such as a battery, if the coupling between the wireless power transmitter and receiver is insufficient to provide sufficient power to maintain the wirelessly powered appliance in an active state, the wirelessly powered appliance may reset, shut off and/or operate in an indeterminate manner, potentially while performing a location process, thereby inhibiting the ability to complete the location process without having to restart. Conversely, if too much power is supplied, a risk exists that an overvoltage protection circuit could be triggered and preclude detecting movement-related changes in harvested voltage.

Therefore, by controllably varying a variable load during a location process, the harvested voltage from the wireless power signal may be maintained within a range that avoids any potential adverse undervoltage or overvoltage issues that might otherwise arise in the wirelessly powered appliance. In some embodiments, for example, a variable load may be controlled to maintain the harvested voltage above a reset voltage level associated with a risk of resetting or otherwise underpowering digital electronics on the wirelessly powered appliance and/or below an overvoltage protection level associated with a risk of triggering an overvoltage protection circuit on the wirelessly powered appliance.

For the purposes of this disclosure, the reset voltage level and the overvoltage protection level may effectively define an operational envelope for the wirelessly powered appliance, whereby operation with a harvested voltage outside of the operational envelope is not desirable. In other embodiments, other aspects of the wirelessly powered appliance may constrain the operational envelope that may be appropriate for that particular appliance. It is therefore desirable to control the variable load to maintain the harvested voltage within a predetermined range that restricts operation outside of the operational envelope of the wirelessly powered appliance.

As will become more apparent below, a location process consistent with the invention may be performed in a wirelessly powered appliance, performed by a wireless power system, or may have different aspects of the process performed by the wirelessly powered appliance and the wireless power system. An apparatus for locating a wireless power transmitter may therefore, in some embodiments, be a wirelessly powered appliance (or a component thereof), a wireless power system (or a component thereof), or a combination of components from both a wirelessly powered appliance and a wireless power system. Further, in some embodiments, at least a portion of the location process may be performed by a user device in communication with the wireless power system and/or the wirelessly powered appliance, e.g., using an app running on the user device. In some embodiments, for example, an app on a user device may serve as a user interface for the wireless power system and/or the wirelessly powered appliance to coordinate performance of the location process. Doing so may be particularly beneficial where a wireless power system and/or wirelessly powered appliance only includes a relatively primitive user interface (e.g., limited to indicator lights and physical buttons), or no user interface at all.

In addition, in the embodiments discussed below, a location process is described within the context of a Ki wireless power system. The location process may be performed (but does not necessarily have to be performed) using lower power NFC communications that are generally used during initial coupling and handshaking between a wirelessly powered appliance and a wireless power system, and prior to transitioning to a full power state where higher operational power is provided to the wirelessly powered appliance. In some embodiments, for example, a wireless power signal may be utilized that is less than about 200 mW, and it may be desirable to vary a variable load to maintain the harvested voltage from the wireless power signal within a range of about 7 to about 11 volts, which may be suitable for maintaining the harvested voltage above an undervoltage threshold such as about 4.6 V, which could result in insufficient power being supplied to the digital electronics in the wirelessly powered appliance, as well as below an overvoltage threshold such as about 13 V, which could otherwise trigger an overvoltage protection circuit in the wirelessly powered appliance. It will be appreciated, however, that the range utilized in other embodiments may vary based upon the particular levels at which undesirable undervoltage and/or overvoltage effects may occur.

Figure 4:
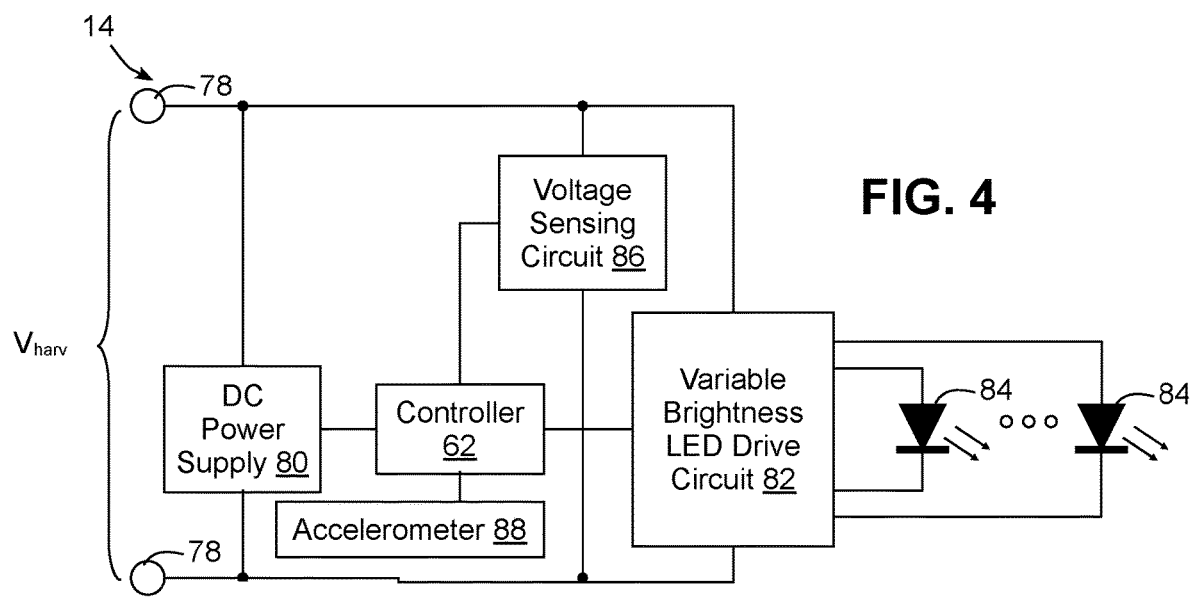
FIG. 4 is a block diagram of example control logic for the wirelessly powered appliance of FIGS. 1 and 3.

It will be appreciated that a variable load, and the manner in which it is controllably-varied, may be different in different embodiments. FIG. 4, for example, illustrates an embodiment where light emitting diodes (LEDs) may be controllably-driven to vary the load driven by a received wireless power signal. In particular, a wireless power signal may be used to supply a power signal with a voltage of $V_{harv}$ over a pair of input terminals 78 of wirelessly powered appliance 14. A DC power supply 80, e.g., a 5 VDC power supply, may be used to power controller 62, which may in turn control a variable brightness LED drive circuit 82 that drives a plurality of LEDs 84. In some embodiments, circuit 82 may drive all LEDs 84 as a group, while in other embodiments, LEDs 84 may be individually controllable for brightness and/or individually turned on or off. Variable brightness LED drive circuit 82 may present a variable load across terminals 78, and as a result, the harvested voltage $V_{harv}$ may vary based upon both the amount of power supplied by the wireless power signal as well as the current drawn by variable brightness LED drive circuit 82 (given that power is the product of current and voltage).

In addition, in the illustrated embodiment, the harvested voltage is used as an alignment parameter, and a voltage sensing circuit 86 may be utilized by controller 62 to determine the level of the harvested voltage. In some embodiments, for example, a voltage sensing circuit may convert the harvested wireless power (e.g., a 13.56 MHz signal as defined by the Ki wireless power standard) to a 0 to 3.3 VDC voltage using a full-wave bridge of Schottky rectifiers, a filter incorporating multilayer chip ceramic capacitors (MLCCs), and a resistive voltage divider.

Furthermore, in order to determine the direction of movement of the wirelessly powered appliance relative to the wireless power transmitter, an accelerometer 88 may also optionally be coupled to controller 62 and provide two or three dimensional acceleration data, and thereby enable controller 62 to determine the direction of movement of the wirelessly powered appliance, and in some instances, recommend a next direction of movement to improve alignment.

LEDs 84, in the illustrated embodiment, may be functional LEDs utilized in the wirelessly powered appliance, e.g., to provide status information and/or for aesthetic purposes. It will be appreciated, however, that in other embodiments, other electronic components may be used as variable loads, including "dummy" electronic components that are otherwise unused during the operation of the wirelessly powered appliance. Various components such as diodes, resistors, digital potentiometers, transistors, capacitors, inductors, etc. (and combinations thereof) that are capable of varying the relationship between the harvested voltage and the power level of the received wireless power signal may be used in other embodiments. In addition, in some embodiments, a variable load may include a combination of discrete loads that may be switched on or off to vary the overall load. Thus, for example, where multiple LEDs are used as the variable load, the load may be controllably-varied by switching one or more of the LEDs on or off (which in this context, may be considered to be discrete loads), and optionally controlling the brightness of those LEDs that are currently active. Moreover, it will be appreciated time-based approaches may be used in some embodiments, e.g., using pulse width modulation (PWM) in variable brightness LED drive circuit 82 to control the brightness of LEDs 84 and/or varying the controller operating frequency. Other manners of controllably varying a load may be used in other embodiments, as will be appreciated by those of ordinary skill having the benefit of the instant disclosure.

Figure 5:
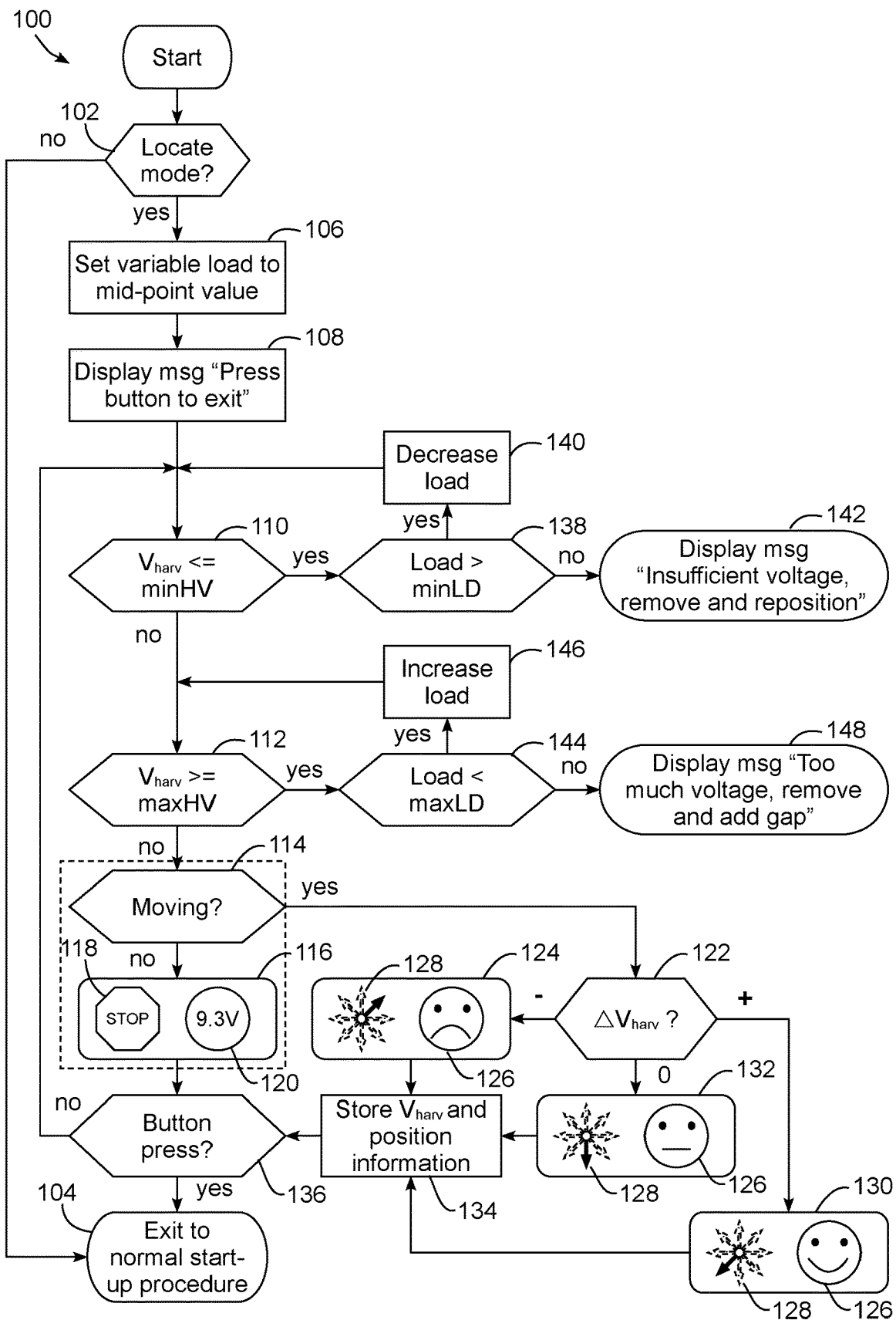
FIG. 5 is a flowchart illustrating an example operational sequence for locating a wireless power transmitter using the wireless power system of FIGS. 1-4.

FIG. 5 next illustrates an example operational sequence 100 for locating a wireless power transmitter. As noted above, operational sequence 100 may be used in some embodiments to locate a wireless power transmitter for the purpose of applying an indicator at an optimal position on a surface (e.g., using a task-specific installation appliance or an operational appliance), or alternatively may be used in some embodiments to locate a wireless power transmitter for the purpose of aligning an operational appliance immediately prior to use. Operational sequence 100 is also implemented, for example, in a controller of a wirelessly powered appliance, although as noted above, the invention is not so limited, as some or all of the functionality in operational sequence 100 may be implemented within a wireless power system in some embodiments.

Operational sequence 100 may be initiated, for example, upon initial power up of the wirelessly powered appliance, and may begin in block 102 by determining if the appliance is in a locate mode, e.g., by checking a non-volatile memory bit that has been set to indicate that a location process should be initiated. In some embodiments, for example, a user interface of the wirelessly powered appliance may be usable to enable a user to select a location process, which may cause the non-volatile memory bit to be set and the wirelessly powered appliance to be rebooted, such that upon startup of the wirelessly powered appliance, the set memory bit may be detected to start the location process. In other embodiments, e.g., where a task-specific installation appliance is used, block 102 may be omitted, while in other embodiments, a location process may be initiated by depressing a dedicated button on the wirelessly powered appliance. A location process may also be recommended by the wirelessly powered appliance, e.g., when poor coupling between the wireless power transmitter and receiver is detected. Other manners of initiating a location process will be appreciated by those of ordinary skill having the benefit of the instant disclosure, so the invention is not limited to the specific manners disclosed herein.

If the appliance is not in a locate mode, block 102 may pass control to block 104 to transition to the normal start up procedure for the wirelessly powered appliance, e.g., to negotiate with the wireless power system and establish an operational power source for the wirelessly powered appliance, e.g., as defined by the Ki wireless power standard.

If, however, the appliance is in a locate mode, block 102 passes control to block 106 to set the variable load to an initial value, e.g., a mid-point value. For example, where a variable brightness LED drive circuit is used as a variable load, the LEDs may be illuminated at a mid-point brightness level. Next, in block 108, a message may be displayed to a user, e.g., on a user interface of the wirelessly powered device or an app of a user device in communication therewith, notifying the user that the location process may be terminated by pressing a particular button on the wirelessly powered appliance or the app (e.g., "Press button to exit").

Control then passes to blocks 110 and 112, which determine whether the current harvested voltage $V_{harv}$ is within a predetermined range. Block 110 determines whether the harvested voltage meets a minimum threshold, e.g., is less than or equal to a minimum harvest voltage level (minHV). Similarly, block 112 determines whether the harvested voltage meets a maximum threshold, e.g., is greater than or equal to a maximum harvest voltage level (maxHV). In some embodiments, for example, minHV may be about 7 Volts to allow a buffer before causing an undervoltage condition that could potentially cause a reset of the wirelessly powered appliance, while maxHV may be about 11 Volts to allow a buffer before causing an overvoltage condition that could potentially trigger an overvoltage protection circuit.

Assuming initially that the harvested voltage is within range, control passes from block 110, to block 112, and then to block 114, which determines whether the wirelessly powered appliance is currently moving (e.g., as determined from an accelerometer). Movement may be detected, for example, by capturing acceleration values at a plurality of sampling intervals (e.g., in a separate thread) and deriving velocity from the captured acceleration values. If not, a display such as display 116 may be presented to the user, including an indication 118 that the wirelessly powered appliance is not currently in motion (e.g., a stop sign icon) and an indication 120 of the current value of the harvested voltage.

If the wirelessly powered appliance is currently moving, block 114 passes control to block 122. If no accelerometer is used, however, block 114 may be omitted, and control may pass from block 112 to block 122. In either event, block 122 determines whether the harvested voltage has changed when the wirelessly powered appliance was moved to a new position. In some embodiments, a change may be detected by comparing the current value of the harvested voltage with a previous value of the harvested voltage to calculate a value $\Delta V_{harv}$, e.g., by subtracting the previously value from the current value. If the harvested voltage has decreased, for example, $\Delta V_{harv}$ may be a negative value, and a display such as display 124 may be displayed, including, for example, an indicator 126 indicating that the last movement was not helpful (e.g., a sad face icon).

In addition, where an accelerometer is used, an indicator 128 may also be displayed to display a recommended direction of movement to improve alignment. The recommended direction, for example, may be based on analysis of one or more previous positions and the harvested voltage at each of those positions. Further, in some embodiments, the indicator 128 may indicate one or more predetermined directions of movement (e.g., up/down/left/right in some embodiments, in eight cardinal directions as shown in FIG. 5, or with additional angular precision in other embodiments). In addition, in some embodiments the indicator may also indicate a length of movement, e.g., by varying the length of the displayed arrow. Triangulation may be used in some embodiments based upon analysis of multiple previous positions, while in other embodiments, a recommended direction may be based on a single previous position.

Returning to block 122, if the harvested voltage has increased, $\Delta V_{harv}$ may be a positive value, and a display such as display 130 may be displayed, including, for example, with indicator 126 indicating that the last movement was helpful (e.g., a happy face icon), and if an accelerometer is used, with indicator 128 indicting a recommended direction of movement to further improve alignment. Likewise, if the harvested voltage has not changed (or where the change is below a threshold), a display such as display 132 may be displayed, including, for example, with indicator 126 indicating that the last movement produced no change (e.g., a neutral face icon), and if an accelerometer is used, with indicator 128 indicting a recommended direction of movement to improve alignment.

Upon display of any of displays 124, 130, or 132, control may pass to block 134 to store the current harvested voltage, and in some instances, position information about the current position of the wirelessly powered appliance (e.g., based on the captured data form the accelerometer over time). The stored data may then be used to determine $\Delta V_{harv}$ in future iterations of the process, and in some instances, to determine recommended directions of movement.

Control next passes to block 136 to determine if the button used to terminate the location process has been pressed, and if so, control passes to block 104 to exit to the normal start-up procedure for the wirelessly powered appliance. Otherwise, control returns to block 110 to perform another iteration of the location process.

Returning to block 110, if it is determined that the harvested voltage meets the minimum threshold minHV, control passed to block 138 to determine if the variable load meets a minimum load threshold (minLD), which is associated with a minimum load that may be selected in the wirelessly powered appliance. If not, control passes to block 140 to decrease the variable load (and thereby increase the harvested voltage), and then return control to block 110 to determine if the harvested voltage is now within the desired range. As such, blocks 110, 138 and 140 may incrementally decrease the variable load until the harvested voltage is within the desired range. If, however, the variable load falls below the minimum load threshold minLD, block 138 instead passes control to block 142 to generate an undervoltage notification, e.g., by displaying a message indicating that the load cannot be decreased further, and that there is insufficient received wireless power to complete the location process. The message may also suggest that the user retry the location process at a new position (e.g., "Insufficient voltage, remove and reposition"). The current location process then terminates.

Similarly, returning to block 112, if it is determined that the harvested voltage meets the maximum threshold maxHV, control passed to block 144 to determine if the variable load meets a maximum load threshold (maxLD), which is associated with a maximum load that may be selected in the wirelessly powered appliance. If not, control passes to block 146 to increase the variable load (and thereby decrease the harvested voltage), and then return control to block 112 to determine if the harvested voltage is now within the desired range. As such, blocks 112, 144 and 146 may incrementally increase the variable load until the harvested voltage is within the desired range. If, however, the variable load increases beyond the maximum load threshold maxLD, block 144 instead passes control to block 148 to generate an overvoltage notification, e.g., by displaying a message indicating that the load cannot be increased further, and that there is too much received wireless power to complete the location process. The message may also suggest that the user retry the location process after adding a gap between the wireless power transmitter and receiver (e.g., "Too much voltage, remove and add gap"). In some embodiments, for example, where a wireless power transmitter is installed underneath a countertop, a spacer may be added to increase the distance between the wireless power transmitter and the upper surface of the countertop. The current location process then terminates.

As noted above, in the illustrated embodiment, minimum and maximum load thresholds (minLD and maxLD) may be used to constrain the amount that the variable load can be varied in blocks 138 and 144. In other embodiments, however, voltage thresholds may be used to constrain the amount of load variance. For example, an additional minimum voltage threshold that is lower than minHV may be tested in block 138 to selectively generate an undervoltage notification in block 142, while an additional maximum voltage threshold that is higher than maxHV may be tested in block 144 to selectively generate an overvoltage notification in block 148.

It will be appreciated that, while certain features may be discussed herein in connection with certain embodiments and/or in connection with certain figures, unless expressly stated to the contrary, such features generally may be incorporated into any of the embodiments discussed and illustrated herein. Moreover, features that are disclosed as being combined in some embodiments may generally be implemented separately in other embodiments, and features that are disclosed as being implemented separately in some embodiments may be combined in other embodiments, so the fact that a particular feature is discussed in the context of one embodiment but not another should not be construed as an admission that those two embodiments are mutually exclusive of one another. Various additional modifications may be made to the illustrated embodiments consistent with the invention. Therefore, the invention lies in the claims hereinafter appended.

What is claimed is:

1. A method of locating a wireless power transmitter, comprising:
   in a wirelessly powered appliance, receiving a wireless power signal communicated by the wireless power transmitter with a wireless power receiver of the wirelessly powered appliance when the wireless power receiver is positioned at a plurality of positions relative to the wireless power transmitter;
   determining a plurality of alignment parameters associated with alignment of the wireless power receiver with the wireless power transmitter at the plurality of positions based at least in part on the received wireless power signal; and
   controllably varying a variable load coupled to the wireless power receiver to maintain a harvested voltage of the wireless power signal within a predetermined range when receiving the wireless power signal, including selectively decreasing the variable load to maintain the harvested voltage above a reset voltage level of the wirelessly powered appliance.

2. The method of claim 1, wherein the plurality of positions includes first and second positions and the plurality of alignment parameters includes first and second alignment parameters respectively associated with the first and second positions, and wherein the method further comprises determining if alignment of the wireless power receiver and the wireless power transmitter is improved when moving from the first position to the second position by comparing the first and second alignment parameters.

3. The method of claim 2, further comprising generating a notification indicating whether the alignment of the wireless power receiver and the wireless power transmitter is improved when moving from the first position to the second position.

4. The method of claim 3, further comprising:
   determining a suggested movement direction based at least in part on the comparison of the first and second alignment parameters; and
   generating a direction notification indicating the suggested movement direction.

5. The method of claim 4, wherein determining the suggested movement direction is further based upon input from an accelerometer of the wirelessly powered appliance.

6. The method of claim 2, wherein the first and second alignment parameters are first and second harvested voltage values.

7. The method of claim 1, wherein varying the variable load includes decreasing the variable load when the wireless power receiver is positioned at a first position of the plurality of positions in response to determining that the harvested voltage of the wireless power signal meets a first threshold.

8. The method of claim 7, further comprising generating an undervoltage notification when the wireless power receiver is positioned at a second position of the plurality of positions in response to determining that the harvested voltage of the wireless power signal meets a second threshold that is below the first threshold.

9. The method of claim 7, further comprising generating an undervoltage notification when the wireless power receiver is positioned at a second position of the plurality of positions in response to determining that the variable load meets a second threshold.

10. The method of claim 1, wherein varying the variable load includes increasing the variable load when the wireless power receiver is positioned at a first position of the plurality of positions in response to determining that the harvested voltage of the wireless power signal meets a first threshold.

11. The method of claim 10, further comprising generating an overvoltage notification when the wireless power receiver is positioned at a second position of the plurality of positions in response to determining that the harvested voltage of the wireless power signal meets a second threshold that is above the first threshold.

12. The method of claim 10, further comprising generating an overvoltage notification when the wireless power receiver is positioned at a second position of the plurality of positions in response to determining that the variable load meets a second threshold.

13. The method of claim 1, further comprising initializing the variable load at an initial load at initiation of a wireless power transmitter locating process.

14. A method of locating a wireless power transmitter, comprising:
   in a wirelessly powered appliance, receiving a wireless power signal communicated by the wireless power transmitter with a wireless power receiver of the wirelessly powered appliance when the wireless power receiver is positioned at a plurality of positions relative to the wireless power transmitter;
   determining a plurality of alignment parameters associated with alignment of the wireless power receiver with the wireless power transmitter at the plurality of positions based at least in part on the received wireless power signal; and
   varying a variable load coupled to the wireless power receiver to maintain a harvested voltage of the wireless power signal within a predetermined range when receiving the wireless power signal;
   wherein the wireless power transmitter and the wireless power receiver are compliant with the Ki wireless power standard, and wherein varying the variable load coupled to the wireless power receiver to maintain the harvested voltage of the wireless power signal within the predetermined range when receiving the wireless power signal maintains the harvested voltage above a reset voltage level and below an overvoltage protection voltage level of the wirelessly powered appliance.

15. The method of claim 1, wherein the variable load includes one or more LEDs driven by a variable brightness LED driver circuit, and wherein varying the variable load includes varying a brightness of the one or more LEDs.

16. The method of claim 1, wherein the variable load includes a plurality of discrete loads, and wherein varying the variable load includes individually activating or deactivating each of the plurality of discrete loads.

17. An apparatus, comprising:
   at least one memory; and
   at least one processor coupled to the at least one memory and configured upon execution of program code stored in the memory to locate a wireless power transmitter by:
      determining a plurality of alignment parameters associated with alignment of a wireless power receiver of a wirelessly powered appliance with the wireless power transmitter at a plurality of positions based at least in part on a wireless power signal communicated from the wireless power transmitter to the wireless power receiver when the wireless power receiver is positioned at the plurality of positions relative to the wireless power transmitter; and
      controllably varying a variable load coupled to the wireless power receiver to maintain a harvested voltage of the wireless power signal within a predetermined range when receiving the wireless power signal, including selectively decreasing the variable load to maintain the harvested voltage above a reset voltage level of the wirelessly powered appliance.

18. The apparatus of claim 17, wherein the at least one memory and at least one processor are disposed in the wirelessly powered appliance.

19. The apparatus of claim 17, wherein the at least one memory and at least one processor are disposed in a wireless power system that controls the wireless power transmitter.

20. The apparatus of claim 17, wherein the at least one memory and at least one processor are disposed in a user device in communication with at least one of the wirelessly powered appliance and a wireless power system that controls the wireless power transmitter.

* * * * *